Nov. 28, 1944.  C. L. THOMAS  2,363,911
HYDROCARBON CONVERSION
Filed July 28, 1941
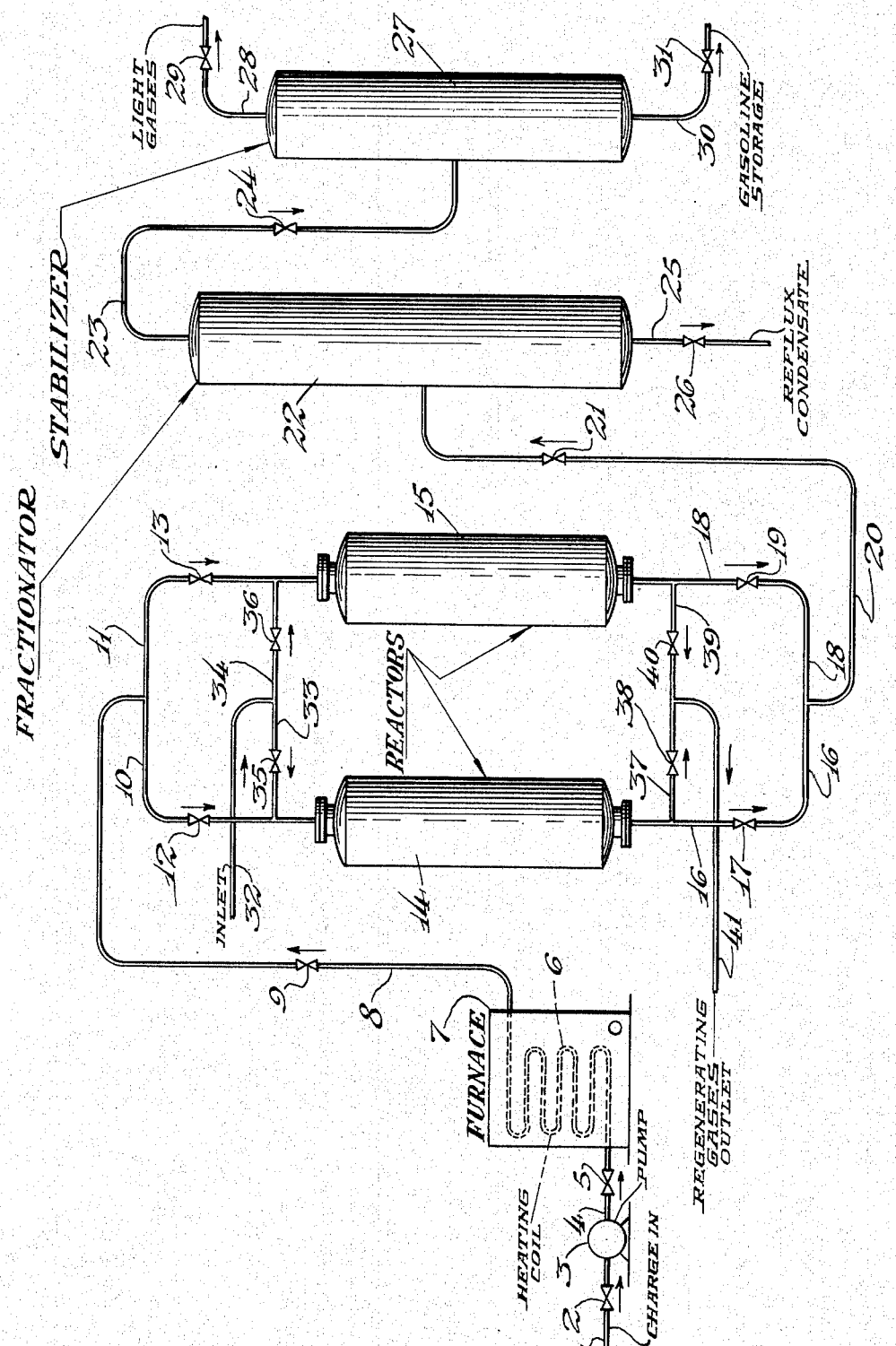
Inventor:
Charles L. Thomas
By Lee J. Gary
Attorney Patented Nov. 28, 1944

2,363,911

UNITED STATES PATENT OFFICE 2,363,911

HYDROCARBON CONVERSION

Charles L. Thomas, Chicago, Ill., assignor to Universal Oil Products Company, Chicago, Ill., a corporation of Delaware Application July 28, 1941, Serial No. 404,375

4 Claims. (Cl. 196—52)

This invention relates to improvements in the method of operating catalytic processes of the type in which the activity of the catalyst is reduced by the deposition of deleterious materials thereon as the operation progresses and wherein the catalyst is periodically reactivated by contacting the same with a reactivating medium which serves to remove the deposited deleterious material without injuring the catalyst.

The features of this invention are applicable to any catalytic reaction of the general type above mentioned, wherein the stream of reactants to be catalytically converted and the stream of reactivating medium are each separately heated prior to their introduction into the reaction zone and wherein said catalytic conversion and reactivation are accomplished simultaneously in separate reactors which are alternated with respect to the reactivating and processing steps. In processes of this general type, the catalytic conversion of the hydrocarbon reactants is an endothermic reaction and the reactivation of the catalyst mass is an exothermic reaction.

The reactivation of the catalytic mass is usually accomplished by the introduction of air or oxygen-containing gases into the reaction zone at a high enough temperature to initiate the combustion of the carbonaceous material. This combustion, however, evolves considerable quantities of heat and it is necessary to take some precaution in the operation to prevent excessive temperatures in the catalyst zone which may permanently injure the catalyst. Although the catalysts used are relatively thermo-stable, excessively high temperatures cause a considerable decrease in catalyst activity. Although the entire cause of this decrease in activity is not clearly understood, there are definite evidences indicating that changes in the physical and chemical structure of the catalyst are contributing factors. Ordinarily, the high temperatures decrease to a relatively large extent the porosity of the catalyst, thereby decreasing its effective surface. The high temperatures also induce a change of state chemically in the more active constituents of the catalyst, thereby partially destroying the catalyst activity.

The heat evolved in the reaction will depend primarily upon the oxygen consumption and the character of the carbonaceous deposits being burned. In order to control the oxygen concentration of the regenerating gases entering the reaction zone, it is the general practice to intermix the air or oxygen with an inert diluting medium such as substantially oxygen-free combustion gases. This makes it possible to control the oxygen concentration available for the combustion of the carbonaceous materials and affords a direct control of the temperature rise in the reaction zone. The regenerating gases perform still another function. These gases are used as a heat removing medium and the amount of heat removed will be dependent upon the specific heat and the rate of flow of the regenerating gases through the reaction zone. The temperature rise in the reaction zone will be therefore dependent upon the oxygen consumption, character of the carbonaceous deposits, specific heat of the regenerating gases, and the rate of flow of said gases through the reaction zone.

The necessity of regenerating the catalyst is probably one of the most objectionable features of the catalytic processes of the type mentioned. This regeneration process entails the use of large and expensive equipment, such as compressors, flue gas generators, heaters, and other auxiliary equipment, which considerably increases the initial and operating costs of the catalytic process. In fact, the operation of the regenerating equipment is ordinarily the major portion of the cost. Therefore, it is necessary to give careful consideration to the capacity of the particular regeneration equipment to be used. It must be designed to supply the desired amount of regenerating gases for the most efficient and most economical operation possible as determined by the capacity of the reactivation equipment.

The amount of regeneration gases necessary will be dependent upon the pounds of carbonaceous material deposited. The deposition of carbonaceous material will depend upon the catalyst, charging stock, and particular conditions of operation used. However, it has been found that the catalysts which are included under the broad scope of this invention, such as the synthetic gel type catalyst used for cracking reaction, gradually lose some of their catalytic activity over an extended period of operation, and as a consequence the deposition of carbonaceous materials tends to decrease during this period. As a result of this drop in carbon deposition, the regenerating gas requirements are lessened which tends to decrease the operating efficiency of the process, since the regenerating equipment was designed for the load necessitated by the carbon deposition on the more active catalyst and will not be operating at its maximum efficiency.

The present invention discloses an improved method of operating such catalytic processes which comprises varying the processing conditions to compensate for losses in catalyst activity over an extended period of operation to maintain a substantially constant overall average deposition of carbonaceous materials, thereby maintaining the regenerating gas requirements substantially constant.

It is understood that the carbon deposition per unit time will vary during the processing period or over a number of cycles if the processing conditions are varied or the carbon-forming tendency of the catalyst changes. The inventive features of the disclosed method of operation lies in varying the processing conditions to compensate for such decreases in the carbon-forming tendencies of the catalyst, thereby regulating the deposition of carbonaceous materials so that the oxidizing medium requirement will be substantially the same as that required when the catalyst was fresh. This deposition of carbonaceous material will hereinafter be referred to as the overall average carbon deposition.

As previously stated above, it is possible to vary the processing conditions to compensate for changes in catalyst activity and to maintain the regenerating gas requirements substantially constant, thereby utilizing the existing regenerating equipment in the most efficient manner. The processing conditions referred to are the processing temperature, feed rate, and length of processing period. The carbon deposition can be maintained at the desired level by varying any or all of the above mentioned processing conditions in the following manner:

(1) Raise the processing temperature.
(2) Decrease the space velocity.
(3) Shorten the time of process.

For instance, it has been found that the rate of deposition of carbonaceous materials is high at the start of the process period and decreases rapidly during the period. As the catalyst activity decreases due to aging or to other effects, the amount of carbonaceous material laid down upon the catalyst mass during the processing period decreases. However, if the processing period is decreased in length, although the carbon deposition per cycle will be decreased due to shorter time on process, the overall deposition is increased, thereby affording a method of compensating for the loss in catalyst activity and enabling the maintenance of a substantially constant regenerating gas requirement throughout the operation.

This method gives a very simple operation. Instead of operating on a definite period length, the processing period is controlled by time necessary to purge and regenerate the reaction zone while operating at a constant optimum regenerating requirement.

The same procedure holds true with the variations in space velocity and processing temperature. These operating conditions are varied to produce a constant overall average deposition of carbonaceous material in order to maintain the regenerating gas requirement substantially constant.

The invention will be more fully understood by the description of the accompanying diagrammatic drawing which illustrates in conventional side elevation one form of apparatus in which the objects of the invention can be accomplished.

In order to simplify the description of the process in relation to the drawing, let it be considered that the particular apparatus being described is being used for the catalytic cracking of hydrocarbons. It must be understood, however, that this does not place any undue limitations on this invention and various other catalytic processes employing solid catalysts which must be periodically regenerated by the oxidation of the carbonaceous materials deposited on the catalyst are included within the broad scope of this invention.

Referring to the drawing, the charging stock, for example, a Pennsylvania gas oil is introduced through line 1 containing valve 2 into pump 3 which discharges into line 4 containing valve 5 into heating coil 6 disposed in furnace 7. The oil derives heat from furnace 7 during its passage through heating coil 6 and is raised to a temperature within the range of 800 to 1200° F. The heated oil leaves furnace 7, through line 8 containing valve 9, and is directed through line 10 or 11 depending upon which reaction zone is being processed. In order to simplify this explanation, let it be assumed that reactor 14 is being processed and reactor 15 is being regenerated. The oil then passes through line 10 containing valve 12 into reactor 14. The pressure in the reaction zone will vary from substantially atmospheric up to about 200 pounds or more superatmospheric.

Reactors 14 and 15 may comprise, for example, cylindrical vessels containing one or a plurality of beds of catalytic material, said vessels being insulated to reduce radiation losses therefrom so that the conversion reaction may be accomplished substantially adiabatically.

In the present drawing only two reactors are shown. However, this invention is not limited to two reactor systems but is applicable to any multiple reactor system containing at least two reactors.

Catalysts which have been found to be effective in the catalytic cracking of hydrocarbon vapors may comprise, for example, powder, pellets or granules containing synthetically prepared purified silica and other siliceous and refractory materials composited with one or more of the compounds selected from the group consisting of alumina, zirconia, and thoria. These catalysts may be used alone or deposited on a refractory relatively inert support.

Although the catalysts recited above are those preferred in the catalytic cracking their use is not to be misconstrued as a limiting feature of this invention. Since the invention herein disclosed is applicable to reactions wherein the processing period is endothermic and the regenerating period exothermic, such as reforming, cyclization, and like processes, it is within the broad scope of this invention to include the catalysts suitable for these processes.

The regeneration of the catalyst disposed in reactor 15 is conducted simultaneously with the processing of the catalyst disposed in reactor 14.

The regenerating gases comprising air or oxygen intermixed with an inert diluting medium are heated to the temperature necessary to initiate the combustion of the carbonaceous materials on the catalyst and are introduced into line 32 and directed through line 34 containing valve 36 into reactor 15. The volume of regenerating gases used will depend upon the amount necessary to produce the most economical and efficient operation and this quantity will be maintained throughout the duration of the operation. As the catalyst ages and the carbon deposition tends to decrease, the processing conditions, such as space velocity, temperature, and cycle length, will be varied as previously described to compensate for the decrease in carbon formation tendency, thereby maintaining a substantially constant regenerating gas requirement. The exit gases leave the reactor through line 39 containing valve 40 into line 41 and may be passed through some heat exchange equipment and later recirculated back into the regenerating system.

The conversion products leave reactor 14 through line 16 containing valve 17 and are directed through line 20 containing valve 21 into fractionator 22 where the gasoline boiling range and lighter hydrocarbons are separated from the heavier hydrocarbons. The reflux condensate leaves fractionator 22 through line 25 containing valve 26 and may be recovered as a product of the reaction or recirculated back into the reaction zone for further conversion.

The gasoline boiling range and lighter hydrocarbons leave fractionator 22 through line 23 containing valve 24 into stabilizer 27 where the lighter hydrocarbons are separated from the gasoline and the gasoline is stabilized to the desired vapor pressure. The stabilized gasoline leaves stabilizer 27 through line 30 containing valve 31 and is sent to storage. The light hydrocarbons leave stabilizer 27 through line 28 containing valve 29 and may be recovered as a product of the process or may be given any further desired treatment.

The above description is presented to clarify the invention disclosed herein and it is not intended that this description shall place undue limitations upon the many variations and modifications which must be included within the broad scope of this invention.

I claim as my invention:

1. A hydrocarbon conversion process which comprises passing a stream of hydrocarbons at conversion conditions of temperature, pressure and space velocity through a reaction zone containing a body of adsorptive contact material for a predetermined period of time, thereafter diverting said stream of hydrocarbons and passing a stream of oxygen-containing regenerating gases through said zone for a time period sufficient to burn carbonaceous substances deposited during the prior conversion period, resuming the passage of said stream of hydrocarbons through the reaction zone at the conclusion of the regenerating period for another predetermined period of time, and changing at least one operating condition including temperature, space velocity and length of conversion period in the subsequent conversion period whereby to compensate for loss of activity of the contact material due to aging and to produce a constant overall average deposition of carbonaceous material in order to maintain the regenerating gas requirement substantially constant.

2. The process of claim 1 further characterized in that the conversion temperature is increased as the contact material loses activity due to aging.

3. The process of claim 1 further characterized in that the space velocity is decreased as the contact material loses activity due to aging.

4. The process of claim 1 further characterized in that the length of the conversion period is decreased as the catalyst loses activity due to aging.

CHARLES L. THOMAS.